P. B. COLE.
MEANS FOR STORING VEHICLES.
APPLICATION FILED MAY 17, 1920.
1,378,168.
Patented May 17, 1921.
3 SHEETS—SHEET 1.
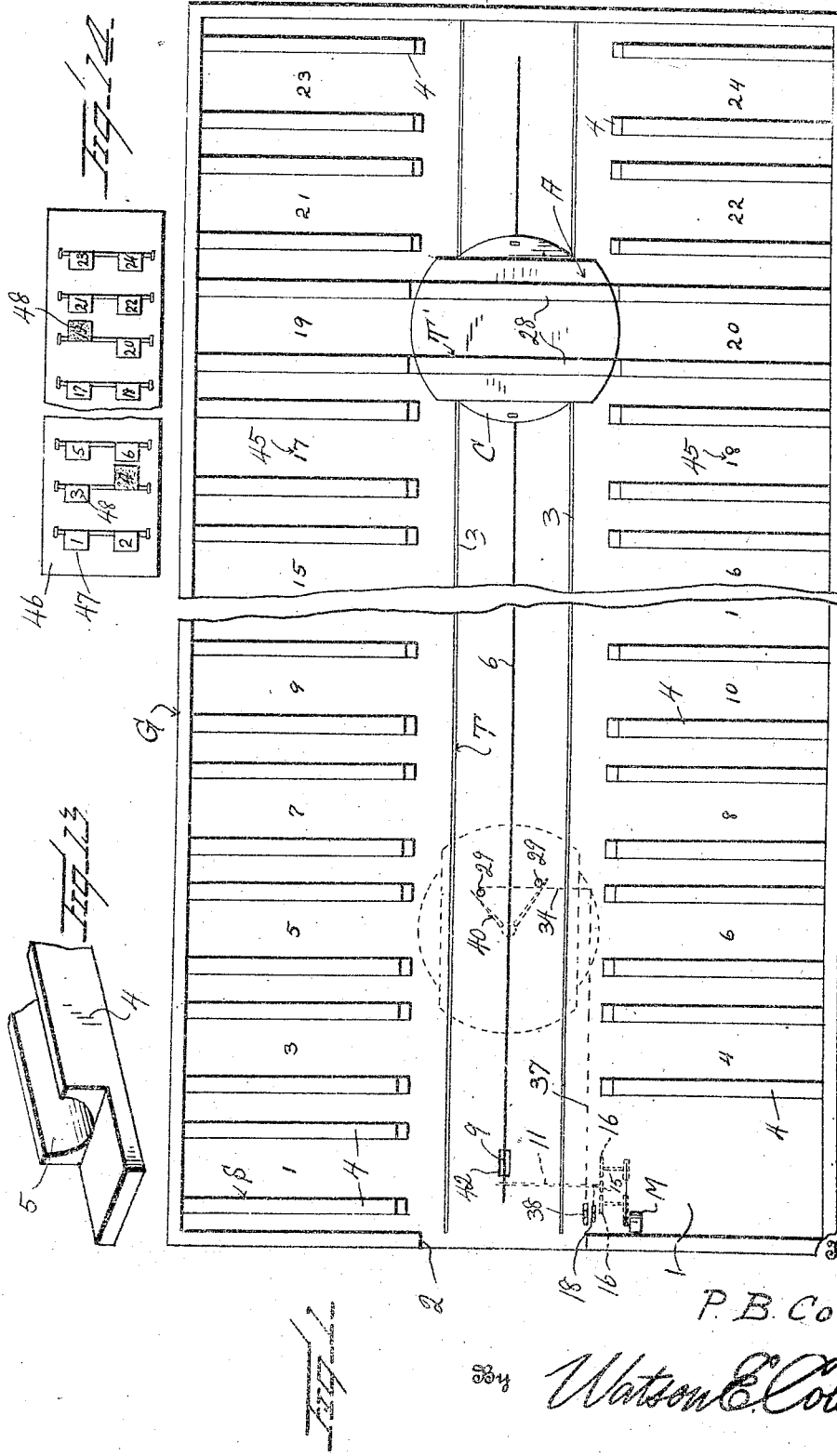
Inventor
P. B. Cole
By Watson E. Coleman
Attorney

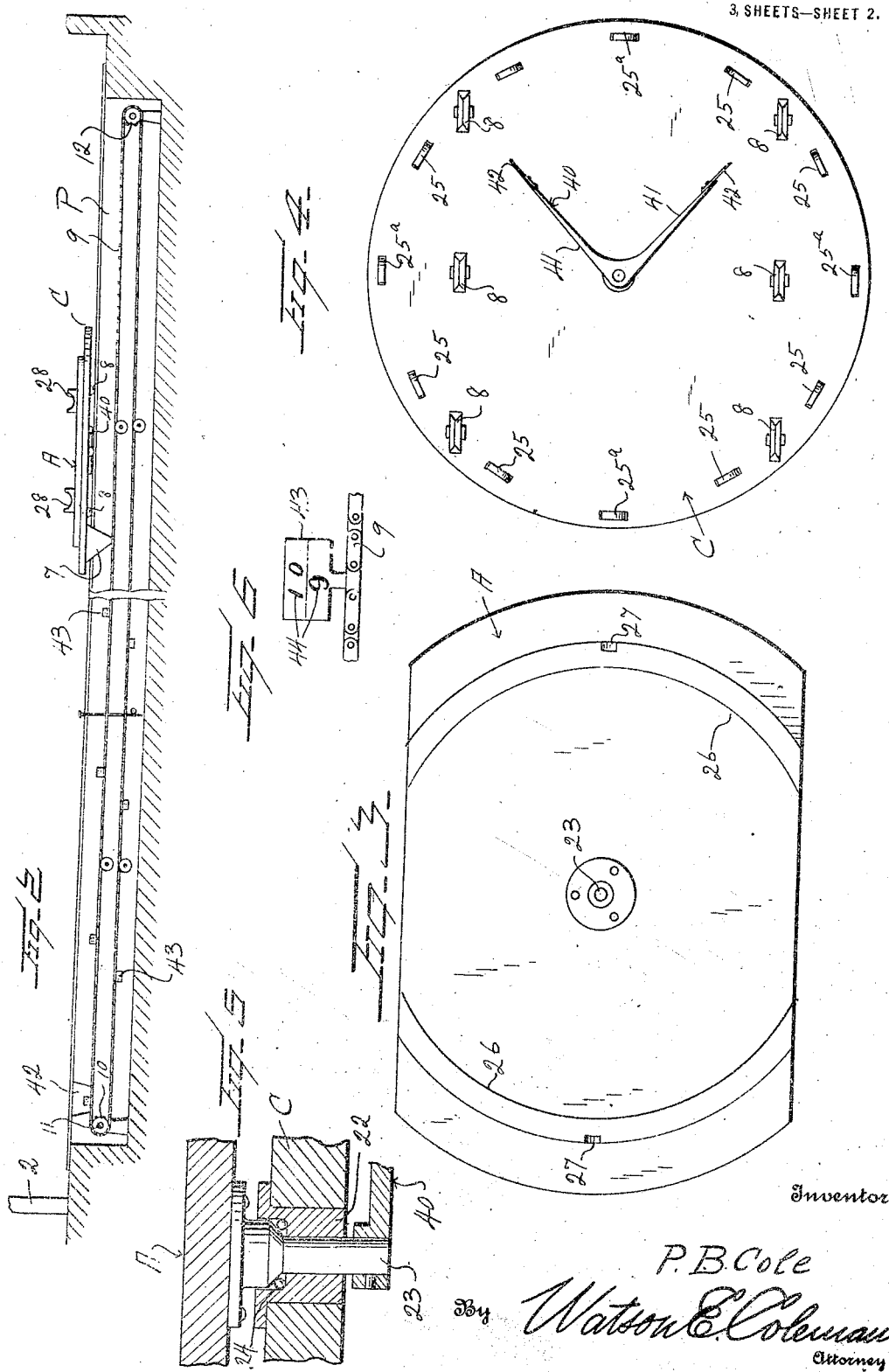

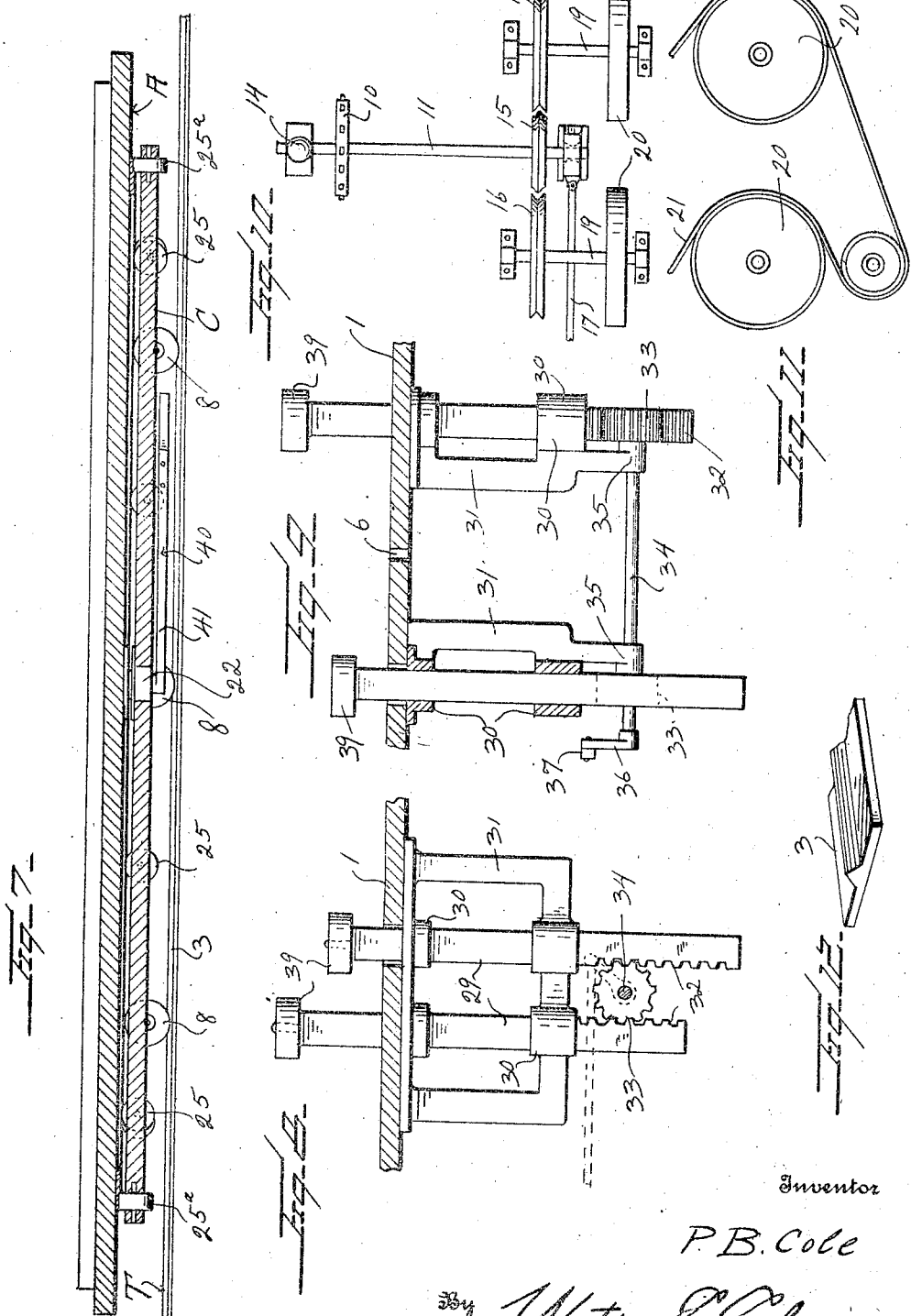

UNITED STATES PATENT OFFICE.

PERINO B. COLE, OF CAMBRIDGE, NEBRASKA.

MEANS FOR STORING VEHICLES.

1,378,168.  Specification of Letters Patent.  Patented May 17, 1921.

Application filed May 17, 1920. Serial No. 382,098.

*To all whom it may concern:*

Be it known that I, PERINO B. COLE, a citizen of the United States, residing at Cambridge, in the county of Furnas and State of Nebraska, have invented certain new and useful Improvements in Means for Storing Vehicles, of which the following is a specification, reference being had to the accompanying drawings.

This invention relates to means for storing automobiles or other vehicles, and it is an object of the invention to provide a novel and improved arrangement whereby one vehicle may be readily and conveniently positioned in its place of storage or removed therefrom without molesting any other vehicles located in their place of storage.

Another object of the invention is to provide a novel and improved means for storing vehicles whereby a maximum number of vehicles may be arranged or stored within a given space and wherein each of said vehicles may be readily positioned into or removed from its particular stall or location in a short period of time and without confusion.

Another object of the invention is to provide a means for storing vehicles which comprises a plurality of stalls, or the like, arranged longitudinally at opposite sides of a trackway, together with a mechanically driven carrier for transporting a vehicle to its particular stall or location for storage.

Another object of the invention is to provide a means of this general character embody a traveling carrier having a turntable arranged thereon and upon which a vehicle is adapted to be positioned, together with means to effect automatically a swinging movement of the table in either direction so that a vehicle mounted thereon may be readily transported to its stall or place of storage.

A still further object of the invention is to provide a novel and improved means of this general character including a plurality of stalls or storage locations arranged alongside of a trackway, together with a vehicle carrier movable along said trackway and wherein means are provided to permit an operator at one end or entrance end of the trackway to readily determine a particular position of the carrier C along the trackway.

The invention consists in the details of construction and in the combination and arrangement of the several parts of my improved means for storing vehicles whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in top plan illustrating a means for storing vehicles constructed in accordance with an embodiment of my invention, a second position of the vehicle carrier being indicated by dotted lines, and of a diagrammatic character;

Fig. 2 is a longitudinal vertical sectional view taken through the structure as illustrated in Fig. 1 and illustrating certain details of construction as embodied in the present invention;

Fig. 3 is a view in bottom plan of the turntable mounted upon the carrier;

Fig. 4 is a view in bottom plan of a carrier and the arms whereby the turn-table may be automatically swung in either direction;

Fig. 5 is an enlarged fragmentary view illustrating in detail the mounting for the turn-table;

Fig. 6 is a fragmentary view in elevation, illustrating an indicating member whereby the operator may determine a particular location of the carrier along the trackway;

Fig. 7 is a longitudinal sectional view taken through the carrier, the turn-table mounted thereon;

Fig. 8 is a fragmentary longitudinal view partly in section and partly in elevation of the vertical movable members whereby the requisite swinging movement is imparted to the turn-table.

Fig. 9 is a fragmentary view partly in transverse section and partly in elevation, illustrating said members;

Fig. 10 is a view in top plan of somewhat a diagrammatic character illustrating the means whereby the carrier may be caused to travel in either direction;

Fig. 11 is a fragmentary view in elevation and of a diagrammatic character illustrating the driving means for the mechanism as illustrated in Fig. 10;

Fig. 12 is a fragmentary view in perspective of a rail upon which the carrier travels;

Fig. 13 is a fragmentary view in perspective of one of the rails comprised in a stall or place of storage for a vehicle; and Fig. 14 is a fragmentary view in elevation of an indicating medium adapted to be employed in connection with my improved device.

As disclosed in the accompanying drawings, G denotes diagrammatically a garage or other building structure embodying the floor 1 and the entrance opening 2.

The floor 1 is preferably rectangular in form with the entrance opening 2 positioned substantially midway an end thereof. Extending longitudinally of the floor 1 and of a length substantially co-extensive therewith is a trackway T embodying the rails 3 of a construction particularly illustrated in Fig. 13. At opposite sides of the trackway are the spaced stalls S with adjacent stalls in relatively close proximity one to the other. As herein embodied, each of the stalls S comprises a trackway embodying a pair of rails 4 in parallelism with each of said rails 4, and preferably of a type illustrated in Fig. 13 wherein the upper surface of said rail is provided longitudinally thereof with the groove or channel 5 in which the wheel of a vehicle, such as a motor car, is adapted to travel.

The floor 1, at a point substantially midway of the rails 3 of the trackway T, is provided with a slot 6 extending longitudinally of said trackway and through which extends a bracket or shoe 7 depending from the marginal portion of a carrier C, herein disclosed as circular in form. Rotatably supported by the carrier C are the grooved wheels 8 which ride upon the rails 3 of the trackway T and whereby said carrier may be readily moved in either direction along said trackway.

The bracket or shoe 7 is preferably in the form of an inverted V with its apex portion operatively connected with an endless member or chain 9. The member or chain 9 is operatively engaged by the sprocket wheel 10, or the like, with a shaft 11 disposed transversely of the trackway T and therebelow and rotatably supported within a pit P below the floor 1. The shaft 11 is positioned adjacent the entrance or forward end of the trackway T and said endless member or chain passes around an idle sprocket 12, or the like, rotatably supported within the pit P adjacent the opposite or inner end of the trackway T. By requisite movement of the member or chain 9, the carrier C may be caused to travel as desired lengthwise of the track T.

As is particularly illustrated in Fig. 10, the shaft 11 at one end portion is supported, as at 14, for swinging movement and the opposite end portion of said shaft has affixed thereto the friction wheel 15 positioned between the driving friction wheels 16 adapted to rotate in the same direction so that upon requisite adjustment of the shaft 11, the friction wheel 15 will be brought into driven contact with either of the wheels 16 in accordance with the desired direction of travel of the carrier C. The shaft 11 may be moved or rocked relative to the wheels 16 in any desired manner but preferably through the medium of a rod 17 operatively engaged with the end portion of the shaft 11 adjacent the wheel 15 and which rod leads to and is engaged with a lever 18 extending above the floor 1 and preferably immediately adjacent the entrance opening 2. It is to be understood, however, that other means may be employed for reversing the direction of travel of the shaft 11.

Each of the driving friction wheels 16, as illustrated in Fig. 10, is mounted upon a shaft 19 to which is fixed a pulley 20. Coacting with the pulleys 20 is a drive belt 21 leading from a suitable source of power, such as an electrical motor M diagrammatically indicated in Fig. 1, although it is to be understood that any source of power for operating the belt 21 may be employed.

At substantially its axial center, the carrier C has disposed therethrough a sleeve or bushing 22 which constitutes a bearing for the trunnion or stub shaft 23 depending from the axial center of the turn-table A, preferably oblong in form with its major axis in excess of the diameter of the carrier C and of a length to readily permit the positioning thereon of automobiles or other vehicles of different types. The trunnion or stub shaft 23 is of a length to terminate below the carrier C but terminates above the floor 1 so that no obstruction is offered to the requisite travel of the carrier C. The trunnion or stub shaft 23 and the sleeve or bushing 22 are so constructed to permit the use of the anti-friction members or ball bearings 24 so that the turn-table A may have requisite rotation with a minimum of frictional resistance.

The peripheral portion of the carrier C is provided with a series of circumferentially spaced rollers 25 and 25$^a$ upon which the end portions of the turn-table A rest or more particularly the arcuate track rails 26 secured to the under surface of the table A and which tracks are arranged on a curve concentric to the trunnion or shaft 23. The rollers 25$^a$ are positioned at quarter points on the carrier C or are spaced apart substantially 90° and each of the rollers 25$^a$ is positioned outwardly of the adjacent rollers 25 and preferably to an extent equal to the thickness of a roller 25. The central portion of each of the track rails 26 in its outer portion and midway of its ends is provided with a notch 27 arranged in the path of travel of the rollers 25ª but out of the path of travel of the rollers 25. When the longitudinal axis of the table A is disposed longitudinally of the trackway T or in a position at right angles thereto, a pair of diametrically opposed rollers 25ª will seat in the notches 27 whereby said table A is effectively maintained in either of these two positions. The mounting for the rollers 25ª is sufficiently loose to permit the seating of such rollers within the notches 27.

Extending longitudinally of the turn-table A is a trackway T' embodying the parallel rails 28 spaced apart substantially the same distance as the rails 4 embodied in a stall or storage location S so that when the longitudinal axis of the table A is at right angles to the trackway T, the rails 28 of the trackway T' may be brought into requisite alinement with the rails 4 of a particular stall or storage location S.

At a predetermined point inwardly of the forward end of the trackway T and between the rails 3 thereof is a pair of vertically movable trips 29, one of said trips being positioned at each side of the slot 6. The trips 29 are disposed through the floor 1 and supported for rectilinear movement in a fixed path by the bearings 30 carried by the brackets 31. The brackets 31 are suitably secured to the under surface of the floor 1 and depend therefrom. The inner faces of the lower portion of the trips 29 below the brackets 31 are provided with the racks 32 with each of which meshes a pinion 33 fixed to a transversely disposed shaft 34. The shaft 34 is rotatably supported by the bearings 35 provided at the lower portions of the brackets 31. One end portion of the shaft 34 is provided with a rock arm 36 to which is operatively engaged a rod 37. The rod 37 is also operatively engaged with a lever 38, or the like, positioned adjacent the entrance opening 2 and affords means whereby the shaft 35 may be rocked to raise or lower the trips 39 as may be required. The upper end portions of each of the trips 29 is provided with a roller 39.

Fixed to the lower end portion of the stub shaft or trunnion 23 is the apex portion of a trip member 40. The member 40 includes the arms 41 in requisite angular relation and of a length, when the table A has its major axis disposed longitudinally of the trackway T to extend across the planes disposed longitudinally of the trackway in which the trips 29 are positioned. It is preferred that the outer or free end portion of each of the arms 41 be provided with the supplemental arm 42 adapted to be adjusted longitudinally of the arm 41, as the occasions of practice may demand.

In practice, the carrier C is positioned in close proximity to the entrance opening 2 with the trackway T' on the table A extending in a direction longitudinally of the track T. The automobile or other vehicle is then run upon the trackway T' whereupon the shaft 11 is adjusted to cause the friction wheel 15 to engage a friction wheel 16 to cause said carrier C to move inwardly along the trackway. The shaft 34 is also rocked to raise a trip 29 dependent upon the side of the trackway T at which the automobile or vehicle is to be stored. As the carrier C travels along the trackway T, the raised trip 29 or more particularly the roller 39 carried thereby will contact with an arm 41 of the member 40 and as the carrier C continues to rotate, the table A will be caused to make substantially a quarter turn in the proper direction so that when the carrier C is stopped before the desired stall or storage location S, the occupant of the vehicle may readily drive or move the same upon the rails 28 comprised in said stall or place of storage S.

In taking an automobile or other vehicle out, the operation is substantially reverse and it will be understood that as the carrier C approaches the entrance opening 2, a raised trip 29 will contact with the desired arm 41 of member 40 and will swing the table A in a position whereby the trackway T' of the table A is substantially alined with a trackway T so that when the carrier C is brought to a stop at the entrance opening 2, the vehicle may readily be run out.

It is to be understood that when the trips 29 have their upper ends substantially in horizontal alinement, said trips are in a central position, permitting the carrier C to pass thereover without any movement to the turn-table A. This is of particular advantage when it is necessary to impart a return movement to the carrier C to bring the same to a stall or place of storage S in advance of the trips 29.

The forward end portion of the slot 6, at a point in close proximity to the entrance opening 2 or particularly with respect to the levers 18 and 38, is enlarged, as at 42, to provide a sight opening whereby visual access may be had to upstanding plates 43 carried by the upper stretch of the member or chain 9. The side of the plate 43 facing the operator at the levers 18 and 38 is provided with the identifying characters 44, preferably numerals, which permit the operator to determine when the carrier C has reached the desired stall or place of storage S. The plates 43 are spaced along the member or chain 9 in accordance with the spacing of the stalls S with each of said plates provided with characters identifying the stalls at opposite sides of the trackway T and said characters 44 coacting with the identifying characters 45 of a pair of stalls arranged at opposite sides of the trackway T. It is also to be understood that the characters 44 of the plates 43 are consecutively arranged reverse to the arrangement of the identify characters 45.

It is also of advantage to provide means whereby the operator can readily determine what stalls may be occupied and a suitable indicator is provided, as indicated in Fig. 14, and which indicator comprises a board 46 adapted to be suitably positioned upon a wall of the garage or building structure adjacent the entrance opening 2 and the levers 18 and 38. Supported by the board 46 for swinging movement is a plurality of paddles 47 equal in number to the stalls S and provided with the complemental identifying characters 48 on the opposite faces thereof, each of said paddles 47 identifying one of the stalls S. The character 48 on one side of a paddle 47 is preferably of one color with the corresponding character on the opposite face of a second color.

When all of the paddles are swung, as to the left, showing characters 48 of one color, it indicates that all of the stalls S are empty. When a stall S is occupied, the corresponding paddle is swung to the right whereby the identifying character of such stall is shown in a second color. For example, Fig. 14 indicates that only two stalls are occupied, namely, stalls "4" and "19". When the cars are taken out of the stalls, the corresponding paddles are returned to their position at the left. By this means, the operator at all times can readily determine the condition of all the stalls or places of storage S.

From the foregoing description, it is thought to be obvious that a means for storing automobiles or other vehicles constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In combination, a carrier, means for moving said carrier, a turn-table mounted upon the carrier, and means positioned at a point along the path of travel of the carrier and coacting with the table to impart turning movement to the table.

2. In combination, a carrier, means for moving said carrier in opposite directions, a turn-table mounted upon the carrier, and means positioned at a point along the path of travel of the carrier and coacting with the table to impart turning movement to the table.

3. In combination, a carrier, means for moving said carrier, a turn-table mounted upon the carrier, and means positioned at a point along the path of travel of the carrier and coacting with the table to impart turning movement to the table, said last named means being dependent on the travel of the carrier.

4. In combination, a carrier, means for moving said carrier, a turn-table mounted upon the carrier, and means positioned at a point along the path of travel of the carrier and coacting with the table to impart turning movement to the table in either direction.

5. In combination, a carrier, means for moving said carrier, a turn-table mounted upon the carrier, and means positioned at a point along the path of travel of the carrier and coacting with the table to impart turning movement to the table, said means for moving the carrier including means to indicate the position of the carrier along its path of travel.

6. In combination, a carrier, means for moving said carrier, a turn-table mounted upon the carrier, means positioned at a point along the path of travel of the carrier and coacting with the table to impart turning movement to the table, and coacting means carried by the carrier and table for normally holding the table against turning movement.

7. In combination with a carrier, means for imparting movement thereto along substantially a fixed path of travel, a turn-table superimposed upon the carrier, a trunnion depending from the table and extending through the carrier, an arm secured to the trunnion below the carrier, a vertically movable member positioned at a point along the path of travel of the carrier, and means for moving said member in opposite directions, said member when raised, being positioned to engage the arm as the carrier moves to swing the turn-table.

8. In combination with a carrier, means for imparting movement thereto along substantially a fixed path of travel, a turn-table superimposed upon the carrier, a trunnion depending from the table and extending through the carrier, a pair of diverging arms fixed to the trunnion below the carrier, a pair of vertically movable members spaced transversely of the path of travel of the carrier, and means for moving said members in unison but in reverse directions, each of said members, when raised, being positioned to engage one of the diverging arms whereby the continued travel of the carrier swings the table in one direction.

9. In combination, a trackway, stalls arranged alongside of the trackway, a carrier traveling on the trackway, a turn-table mounted on the carrier, and means for moving the carrier, said means including means to indicate at a single point along the trackway the position of the carrier with respect to the stalls.

10. In combination, a trackway, stalls arranged alongside of the trackway, a carrier traveling on the trackway, a turn-table mounted on the carrier, and means for moving the carrier, said means including means to indicate at a single point along the trackway the position of the carrier with respect to the stalls, said indicating means including plates movable along the trackway, each of said plates being provided with data to identify a particular stall.

11. In combination with a carrier, a turntable mounted thereon, and automatic means for holding said turn-table normally against movement with respect to the carrier when the turn-table is in a pre-determined position.

12. In combination with a carrier, means for moving said carrier, a turntable mounted upon the carrier, means to impart turning movement to the table, and means to indicate the position of the carrier along its path of travel.

13. In combination with a carrier, means for moving said carrier, a turntable mounted upon the carrier, means to impart turning movement to the table, and means to indicate at a single point the position of the carrier along its path of travel.

14. In combination with a carrier, means for imparting movement thereto along a substantially fixed path of travel, a turntable mounted upon the carrier, an arm operatively engaged with the carrier for imparting turning movement thereto, and a member movable into or out of the path of travel of the arm, said member, when in the path of travel of the arm, engaging said arm as the carrier moves to swing the turntable.

In testimony whereof I hereunto affix my signature.

PERINO B. COLE.